United States Patent [19]

Jensen et al.

[11] Patent Number: 4,990,380
[45] Date of Patent: Feb. 5, 1991

[54] HEAT RECOVERABLE ARTICLE

[75] Inventors: Per J. T. Jensen, Slangerup, Denmark; George B. Park, Swindon, England; Stephen M. Baigrie, Swindon, England; George M. J. Gansbuehler, Swindon, England; Richard J. Penneck, Swindon, England

[73] Assignee: Raychem Corporation, Menlo Park, Calif.

[21] Appl. No.: 241,749

[22] Filed: Sep. 8, 1988

[30] Foreign Application Priority Data

| Sep. 9, 1987 | [GB] | United Kingdom | 8721181 |
| Sep. 9, 1987 | [GB] | United Kingdom | 8721179 |
| Oct. 9, 1987 | [GB] | United Kingdom | 8723761 |
| Oct. 9, 1987 | [GB] | United Kingdom | 8723759 |
| Dec. 14, 1987 | [GB] | United Kingdom | 8729119 |
| May 4, 1988 | [GB] | United Kingdom | 8810522 |

[51] Int. Cl.$^5$ .................................... H05B 3/06
[52] U.S. Cl. ............................ 428/349; 174/DIG. 8; 219/505; 219/535; 219/549; 428/35.1
[58] Field of Search ............. 428/34.9, 35.1, 413; 174/DIG. 8; 219/505, 535, 549

[56] References Cited

U.S. PATENT DOCUMENTS

| 4,412,125 | 10/1983 | Nagasawa et al. | 428/34.9 |
| 4,421,582 | 12/1983 | Horsma et al. | 428/35.1 |
| 4,570,055 | 2/1985 | McMills | 219/541 |
| 4,675,512 | 6/1987 | Douret et al. | 219/535 |

Primary Examiner—James Seidleck
Attorney, Agent, or Firm—Timothy Richardson; Herbert Burkard

[57] ABSTRACT

A tubular heat recoverable article comprises conductive polymeric material and is heated to effect recovery by the passage of electrical current therethrough. Elongate electrodes are attached on the surface or embedded in longitudinal flanges extending along the article. The flanges also comprise conductive polymeric material but are not heat recoverable, and therefore remain substantially undeformed on recovery other than bending to accommodate transitions. This means that the contact resistance between the electrode and the conductive material of the flange does not increase significantly on recovery.

38 Claims, 3 Drawing Sheets

HEAT RECOVERABLE ARTICLE

This invention relates to an article which comprises a conductive polymeric material, which can be heated by passing electrical current through the conductive polymeric material.

Conductive polymeric materials and devices incorporating them are also well known. Reference may be made for example U.S. Pat. Nos. 2,952,761, 2,978,665, 3,243,753, 3,351,882, 3,571,777, 3,658,976, 3,757,086, 3,793,716, 3,823,217, 3,858,144, 3,861,029, 3,950,604, 4,017,715, 4,072,848, 4,085,286, 4,117,312, 4,151,126, 4,177,376, 4,177,446, 4,188,276, 4,237,441, 4,242,573, 4,246,468, 4,250,400, 4,252,692, 4,255,698, 4,271,350, 4,272,471, 4,304,987, 4,309,596, 4,309,597, 4,314,230, 4,314,231, 4,315,237, 4,317,027, 4,318,881, 4,327,351, 4,330,704, 4,334,351, 4,352,083, 4,361,799, 4,388,607, 4,398,084, 4,413,301, 4,425,397, 4,426,339, 4,426,633, 4,427,877, 4,435,639, 4,429,216, 4,442,139, 4,459,473, 4,470,898, 4,481,498, 4,476,450, 4,502,929; 4,514,620, 4,517,449, 4,534,889, and 4,560,498; J. Applied Polymer Science 19, 813–815 (1975), Klason and Kubat; Polymer Engineering and Science 18, 649–653 (1978), Narkis et al; European Application Nos. 38,713, 38,714, 38,718, 74,281, 92,406, 119,807, 133,748, 134,145, 144,187, 157,640, 158,410, 175,550 and 176,284; and Japanese Published Patent Application No. 59-122,524.

A heat-recoverable article is an article, the dimensional configuration of which may be made substantially to change when subjected to heat treatment. Usually these articles recover, on heating, towards an original shape from which they have previously been deformed, but the term "heat-recoverable", as used herein, also includes an article which, on heating, adopts a new configuration, even if it has not been previously deformed.

Heat recoverable articles are known In their most common form, such articles comprise a heat-shrinkable sleeve made from a polymeric material exhibiting the property of elastic or plastic memory as described, for example, in U.S. Pat. Nos. 2,027,962, 3,086,242 and 3,597,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat unstable form in a separate stage.

In other articles, an elastomeric member is held in a stretched state by a second member, which, upon heating weakens and thus allows the elastomeric member to recover. Heat-recoverable articles of this type are described, for example, in British Patent No. 1,440,524 in which an outer tubular elastomeric member is held in a stretched state by an inner tubular member.

Heat recoverable articles which comprise conductive polymeric materials, and which use ohmic heating of those materials to cause heat recovery are also known. Reference may be made for example to GB No. 1265194 (MP099), U.S. Pat. Nos. 4,085,286 (MP192), 4,017,715 (MP0212), 4,421,582 (MP0219), European Patent Publication No. 0157640 (MP0922) and U.S. Pat. No. 4,570,055 (MP0939).

Two early patent publications describing conductive, recoverable polymeric articles are GB No. 1265194 (Cook) and T905001 (U.S. defensive publication to Day). GB No. 1265194 describes a conductive polymeric, optionally shrinkable tubular layer, which is optionally used in conjunction with a non-conductive shrinkable tubular layer. Current is supplied to the conductive layer, to pass electric current therethrough, by alligator clips or other conventional clamps or electrodes T905001 describes a heat-shrinkable plastics packaging bag, which has a conductive coating or contains conductive particles. The bag is lowered over a pallet to be covered and vertical electrodes attached to diagonally opposite vertical seams of the envelope and powered to cause current to flow between the electrodes to shrink the bag. In both Cook and Day the current flows, as in the present invention, in or parallel to the plane of the article.

It is also known to be desirable to use for a conductive recoverable article, a material which exhibits a PTC (positive temperature coefficient of resistivity) effect, that is a sharp rise in resistivity at a particular, or over a short range of temperatures. This temperature or temperature range is known as the anomaly or switching temperature. Typically the material is selected to exhibit the sharp rise in temperature at or slightly above the recovery temperature of the article. The PTC effect minimises overheating and consequent so-called "thermal runaway" of the material. Materials which exhibit a PTC effect are typically referred to simply as PTC materials.

Where a material exhibits a PTC effect it typically exhibits a curl-over effect, that is it reaches a peak after which the resistivity/temperature curve changes its slope, typically decreasing in slope, levelling off, or falling in resistivity sometimes with a subsequent rise in resistivity. The peak resistivity is the highest resistivity where curl-over with a subsequent decrease in resistivity occurs (referred to herein as negative curl-over), or the point of inflection, where merely a change in slope of the curve occurs (referred to herein as positive curl-over).

One problem involved with the use of such ohmically heated conductive polymeric recoverable articles is that the electrodes or bus wires supplying power to the conductive material must be so arranged to maintain electrical contact with the material during recovery, notwithstanding that during recovery the shape of the article may change, for example shrink, considerably. The problem is most severe where recovery ratios are large.

The problem of maintaining contact during recovery has been recognised in some of the prior art references mentioned. U.S. Pat. Nos. 4,085,286 (MP0192), 4,330,703 (MP0195), 4,017,715 (MP0212) and 4,421,582 (MP0219), for example, describe articles comprising sheets in which the electrodes are arranged to power the conductive polymeric material so that the current flows predominantly through the thickness of the sheet. In order to do this the electrodes are provided in the plane of the sheet, either on the surface or embedded therein. In order that contact is maintained during recovery the electrodes are arranged to accommodate the change in shape. In U.S. Pat. No. 4,085,286 (MP0192) and 4,412,582 (MP0219) for example the electrodes used are pliant, for example braided electrodes, and in U.S. Pat. No. 4,017,715 (MP0212) the electrodes are in the form of a mesh with diamond shaped openings, which openings change their shape (angle) to accommodate the recovery. European Patent Publication No. 0157640 (MP0922) and U.S. Pat. No. 4570055 (MP0939) describe radially shrinkable conductive polymeric tubular articles which can be used as couplers and which can be electrically powered so that the current flows from one end to the other end of the article. In European Patent Publication No. 0157640 (MP0922) silver paint electrodes are applied to the end faces of the tube, or spring biased electrodes or electrodes on flexible leads are used in order that electrical contact is not lost during recovery. In U.S. Pat. No. 4,570,055 (MP0939) annular spring electrodes are used, on the outer surface of the tube, towards each end thereof Except for large recovery ratios, the spring electrodes can follow the radial shrinkage of the tubular article.

We have discovered a simple arrangement of heat recoverable article, comprising a conductive polymeric material, in which contact between the electrode and conductive polymeric material is maintained during recovery. This can be achieved by fixing electrodes to a support element on the conductive recoverable article, which support element is arranged such that it is not deformed, or is only slightly deformed, during recovery so that electrical contact is maintained.

Thus a first aspect of the present invention provides an article, at least a portion of which is heat recoverable, which comprises electrically conductive polymeric material, the article comprising at least two integrally formed, spaced apart support elements for supporting electrodes, each of which support elements:

(a) comprises conductive polymeric material, so that when electrodes are supported thereon or therein, and powered so that the electrodes are of opposite polarity, electrical current flows through the elements to the said heat recoverable portion to effect recovery thereof, and (b) remains substantially undeformed during recovery of the article.

The terms "conductive polymer" and "conductive polymeric material" are used herein to mean a composition which comprises an organic polymer and, dispersed or otherwise distributed in the polymer, a particulate conductive filler in an amount sufficient to render the composition electrically conductive. The term "organic polymer" means any polymer which contains carbon in the backbone and/or the side chains, including, for example, polymers of olefinic monomers, polyamides, polyesters, plyacrylates, polyimides, polycarbonates and polysiloxanes.

The term "support element" is used herein to mean an element that provides a substrate or support for an electrode. It need not provide support in any mechanical sense.

The support elements remain substantially undeformed, other than bending to accommodate transitions. This means that the electrode/support element interface is not subjected to a recovery stress which could increase the contact resistance at the interface.

The provision of electrodes on or in spaced apart support elements is to be contrasted with the prior art techniques for attaching electrodes to conductive polymeric articles described in GB No. 1265194 (Cook) and T905001 (Day) above.

Electrical current to cause ohmic heating and recovery of the recoverable part of the article thus passes from the electrode to the conductive support element, to the main body of the article. Since the electrode is in direct contact with the conductive polymeric material of the element which as previously stated is a region of the article which does not deform significantly during recovery, there is no danger of contact between the electrode and conductive polymeric material being broken during recovery.

The article according to the invention is preferably tubular. The tubular article may be open (wraparound) or closed in cross-section. The articles may be open at one or both ends. The articles may be for example cylindrical, and radially recoverable, for example shrinkable. In this case the support elements are preferably positioned so that when the electrodes are supported thereon, and powered, electrical current flows around predominantly the circumference of the tube, preferably in at least two discrete current paths.

As used herein a wraparound article is a cover or multipart piece which can be positioned around the substrate and secured in a tubular configuration by a closure means. In one embodiment the wraparound article is a cover with upstanding ridges or rails at or near longitudinally opened edges. The ridges or rails may be held together by a channel shaped closure.

Where the tubular article according to the invention is wraparound, one or more electrodes may be provided in or at the closure means.

In one preferred embodiment where the article is tubular, the support elements are provided as longitudinal flanges extending along the tube. Preferably there are two such longitudinal flanges or multiples thereof. Where there are only two flanges these are preferably positioned on opposite sides of the tube. Where there are multiple flanges, these are preferably positioned uniformly around the circumference, said flanges alternately comprising electrodes of opposite polarity. Where the tubular article is wraparound the flanges may also form upstanding ridges and be part of the closure means.

In another embodiment, the support elements are circumferential portions of the tubular article. These are preferably heat stable so they remain substantially undeformed during recovery. In this case the electrical current flows in a single current path along the length of the tube. The article may be arranged to be radially or longitudinally recoverable when electroded in this way.

All or part of the article may be electrically conductive and optionally also heat recoverable. For example for a tubular article, part of the length only (e.g. one end, or a central section) may be conductive and optionally also heat recoverable. Also part of the circumference only of the article may be conductive and optionally also heat recoverable. Thus for example one circumferential portion only may be electrically conductive and optionally also heat recoverable, and the other portion is heat-stable and electrically insulating. Two electrodes may be positioned on longitudinal flanges, separated from each other. One or both of the two paths between the electrodes (measured around the tube in counter directions) may be electrically conductive (and optionally also heat recoverable). This arrangement may enable one circumferential portion only of the tubular article to be recovered by supporting and powering electrodes on the flanges.

A minor or major circumferential portion of the article may be electrically conductive (and optionally heat recoverable). The term "a circumferential portion" of the tube means a portion of the tubing extending at least part way along the length of the tube but only partially around its circumference. Thus in one example two longitudinal electrodes extend along the tube, and are non-uniformly spaced around the tube (i.e. not diametrically opposed) to define minor and major circumferential portions therebetween. Where only a minor circumferential portion is heat-recoverable and/or electrically conductive the article can be used where only a small amount of recovery is needed. For example it can be used to tighten a tubular polymeric sheet around a substrate.

Any suitable electrodes can be used. The electrodes may be applied to the surface of the conductive polymeric material. As examples of such surface-applied electrodes there may be mentioned silver paint strips (applied by painting), thermally sprayed metals (applied by flame or arc spraying), electroless or electroplating, and metal strips secured to the surface e.g. by conductive adhesive. The electrodes may be embedded in the conductive polymeric material. As examples of embedded electrodes there may be mentioned wires, braids or foils or meshes. Penetrative electrically conductive crimps (e.g. toothed crimps) may also be used which penetrate the conductive material of the article.

A preferred embodiment according to the invention comprises suitable electrodes applied to the support elements, i.e. an article according to the invention in combination with the electrodes.

In other embodiments where electrodes are preinstalled, they are fixed within the support elements, for example fully or partially embedded therein. Thus for example elongate electrodes can be embedded in longitudinally extending support elements on a tubular article.

The electrodes are preferably embedded in heat-stable longitudinal support elements extending part or the whole way along the length of the article. Embedding the electrode in heat stable portion ensures that minimal mechanical stress occurs at the electrode/conductive polymer interface, which stress could result in increased electrical resistance at their interface.

Where the electrodes are embedded, the term "embedded" is used to include electrodes that are either totally or partially embedded. A wire can conveniently be totally embedded in a support element on a tubular article. A flat mesh can conveniently be included in a flat support element and trimmed if it extends beyond the boundaries of the element. Where the electrodes are wires, for some applications these wires may be plain wires. For such wires it is particularly important that the support elements remain substantially undeformed since such plain wires are not deformable, and cannot flex or ply to accommodate shape changes in their immediate environment to maintain good contact.

It is also preferred to have on, or attached to the electrode, a means for electrical connection of the electrode structure to an electrical source. The nature of this connection means will vary depending on the type of electrode used.

Where flexibility is required in the tubular part, e.g. where it is to be recovered on to a shaped substrate, it is preferred that the embedded electrode is also flexible. Examples of flexible electrodes include wire braid, and flattened wire spirally wrapped around a central flexible filament.

Embedded electrodes are preferred over surface electrodes in applications where the surface electrode might be subject to damage which could result in a breakdown in the continuity of the electrode or electrical short circuits.

In all embodiments according to the invention in which the article is tubular, and the electrodes and/or the support elements for supporting the electrodes are longitudinal, they may extend the whole or only part way along the length of the tube. Thus, for example, where the electrodes extend only part way and current flows between the electrodes around the periphery (e.g. circumference) of a cross-section of the tube, only that portion of the tube between the electrodes is recovered. In some embodiments according to the invention the electrodes and support elements when present for the electrodes extend from one or both ends of the tube, and end part way along the tube. In other embodiments according to the invention the electrodes extend along the whole length of the article.

The support elements may be in the form of flanges. These may project outwards of the article or inwardly, or both. Where a smooth inner surface is desirable (e.g. for recovery onto a smooth substrate), outwardly projecting flanges may be preferred. Where the article is to be heated and recovered to melt a mass of sealant contained therein, e.g. for cable blocking applications the flanges may project outwardly or inwardly, or both.

Where the support elements project outwardly a clamp may be used electrically and mechanically to connect to the electrodes thereon.

In preferred embodiments the article is tubular, of open or closed cross-section. At least one part for example one or both ends is radially heat shrinkable, and the remaining body of the article is relatively less heat unstable, preferably substantially heat stable. Where two or more parts are shrinkable they may have been deformed to render them recoverable the same or different amounts.

The supporting flanges and/or electrodes, where longitudinal, may extend the whole or part way along the length of the article. Where the part is preferentially expanded, or expanded only in part, the electrodes may extend only along the most expanded part or parts.

Where there is more than one pair of electrodes these may be powered together or separately. They may be powered by the same or different voltages, and for the same or different times.

In embodiments such as the above, with electrodes along part or parts only of the article, the concentration of current flow may be greater at the inwardly directed electrode ends than adjacent the main body of the electrode. If compensation is not made for this, so called "hot-spots" may occur at the inwardly directed electrode ends due to overheating in those areas, causing burn-through of the article. Thus to avoid this problem the article is preferably arranged so that the resistance to current flow of the article at the ends of the electrode is greater than along the main length of the electrode. This may be achieved in a number of ways, and these are discussed in U.S. patent application Ser. No. 07/242,089 and U.S. patent application Ser. No. 07/242,081, abandoned both filed on even date herewith, the entire disclosure of which are incorporated herein by reference.

Articles according to the invention preferably have the electrical characteristics of articles described in contemporaneously filed U.S. patent application Ser. No. 07/242,081, abandoned, the disclosure of which is incorporated herein by reference. Some articles according to that invention are laminar, and at least part of them have been expanded from X% to Y% to make them heat recoverable, the article comprising a conductive polymeric material the resistivity of which decreases on expansion as measured in the direction of current flow in at least part of the expansion range. X may be zero or finite, and Y is greater than X. Other articles according to the invention are laminar and heat recoverable and comprise a conductive polymeric material which has a resistivity which increases on recovery as measured in the direction of current flow, throughout the temperature range 20° C. to $T_e$ (extrapolated end temperature as measured according to ASTM No. D3418-82).

Other articles according to that invention have a so-called pseudo-PTC ratio (peak resistivity: resistivity at 25° C. in the range 1½ to 10), and are connected to electrodes so that current flows parallel to the faces of the article.

In some embodiments the electrodes extend along expanded portions of the article into portions of the article which have not been and will not be deformed, or which have or will be deformed to render them less heat recoverable than the other portions. In such embodiments the material of the article is preferably one which has a resistivity which decreases with expansion in at least part of the expansion range. This means that the less deformed material has a higher resistivity thereby increasing the electrical resistance to current flow at the inwardly directed electrode end.

Where there is an inwardly directed, electrode end, it is preferred that the resistance of the article in the region adjacent the electrode end is greater than in the region adjacent the main length of the electrode. This can be achieved using a material whose resistivity varies with expansion as described above, or by geometry considerations e.g. thinner walls. Another possibility is to use pseudo PTC behaviour. These compensatory factors are described in the above mentioned U.S. patent application Ser. No. 07/242,089 and in U.S. patent application Ser. No. 07/242,081, abandoned.

Where the article is tubular and the supporting elements longitudinal, preferably the entire length of the supporting elements and supported electrode have a component that is substantially parallel to the major axis of the article; i.e. no part of the support elements or electrodes is perpendicular to the major axis of the article. Preferably the entire length of the support element and electrode is parallel to the major axis of the article. Where the article is tubular, and the support elements for supporting electrodes circumferential, preferably the entire length of the support element and electrode has a component that is perpendicular to the major axis of the article, i.e. no part is parallel thereto. Preferably the entire length of the support element and the electrode is perpendicular to the major axis of the article.

In articles according to the invention where non-uniform recovery may occur (e.g. where a part of non-uniform cross-section is recovered, or where a part of any shape is recovered onto an irregularly shaped substrate, or as a result of ambient conditions), the geometry changes of the article which take place on recovery may tend to concentrate the current in the most or first recovered part. The electrical characteristics of the material are preferably arranged to compensate for this. This is described in detail in the, above mentioned U.S. patent application Ser. No. 07/255,007.

Preferably the materials used are such that, for a dimensionally recoverable article of given size and shape, sufficient heat can be generated to effect recovery using a 70 V power source or less.

A number of suitable materials may be used in the present invention. Suitable materials are described in British Patent Application No. 8729123 (RK365 GB1), the entire disclosure of which is incorporated herein by reference. One particular example that may be mentioned here comprises an ethylene vinyl acetate resin, Elvax 460 (trade mark) 59.4 parts by weight, a carbon black filler, Vulcan P (trade mark) 39.6 parts by weight and an antioxidant 1 part by weight. Elvax 460 is an ethylene vinylacetate polymer containing 18% by weight vinylacetate and having a melt flow index of 2.5.

| Polymer (parts by weight) | Carbon Black (parts by weight) | Antioxidant (parts by weight) |
| --- | --- | --- |
| Marlex° HXM 50100 (59.4) | Vulcan° P (39.6) | (1.0) |
| Elvax° 460 (59.4) | Sevalco° N110 (39.6) | (1.0) |
| Sclair° 11D-1 (59.4) | Ensaco° MS (39.6) | (1.0) |
| Elvax° 770 (59.4) | Vulcan° P (39.6) | (1.0) |

°represents a trademark.

The polymeric materials used as follows:
Marlex is a HDPE supplied by Phillips
Elvax 460—described earlier
Sclair 11D-1 is a LLDPE supplied by Du Pont, Canada
Elvax 770 is an EVA supplied by Du Pont.
Vulcan P, Ensaco MS, and Sevalco N110 are supplied by Cabot Corporation, Ensagri Willebroek NV and Sevalco Ltd respectively.

The materials of articles according to the invention are preferably cross-linked before deformation to enhance recoverability. This is preferably done by irradiation e.g. using a beam dose in the range 2-35 MRads, especially 2-25 MRads, for example 10 or 15 MRads.

Where articles are moulded, the cross-linking may also be effected chemically. In this case a single step process can be used to mould and cross-link the material of the article. Such parts formed by moulding, e.g. transfer moulding, injection moulding can have complex shapes. As an example multi-outlet tubular shapes can be made.

Tubular articles according to the invention may be radially or longitudinally recoverable. Radially recoverable articles may be used for example as coverings for supply lines e.g. pipes and cables, for joints therebetween as couplers for such supply lines, or as a blocking technique using a tube filled with sealant which flows to form the block.

Longitudinally recoverable tubular articles can be used, for example to seal annular spaces between substrates, for example in a duct seal, where the longitudinal recovery causes the article to buckle to seal the gap. British Patent Application No. 8723762 (DK006 GB1) describes a tubular conductive polymeric article which has particular application as a duct seal, and which increases in thickness on recovery. It preferably has three longitudinal sections which are electroded and recovered separately. The electrodes may be longitudinal and/or circumferential. The heat stable support elements for the electrodes are preferred for use in the above duct seal, in accordance with the present invention.

U.S. patent application Ser. No. 07/255,007 describes a tubular article which comprises a conductive polymeric material, and is preferably heat-recoverable. It can be urged radially inward either by recovery of itself, or by an elastomeric member. The article is preferably multi-part or wraparound for easy installation. The electrodes on this article are preferably provided in or on heat-stable support elements in accordance with the present invention.

U.S. patent application Ser. No. 07/241,660 describes a tubular conductive polymeric article with electrodes interrupted along its length, allowing separate longitudinal sections to be powered independently. The interrupted electrodes may be provided on heat stable support elements, in accordance with the present invention.

One preferred article according to the invention is a tubular article which has been expanded radially and has two or more, preferably three separately radially shrinkable sections. The article preferably comprises longitudinally separated pairs of electrodes (one pair for each separately radially shrinkable section) arranged to shrink each of the sections. The separately radially shrinkable sections may be separated by corrugated wall sections. One example of such an article is for cable blocking a cable splice, e.g. a splice between optical fibres. For this application there are three separately radially shrinkable sections. The central section contains a large mass of adhesive or other sealant for cable blocking. The end sections are lined with adhesive, e.g. a hot melt adhesive, for bonding to the cables.

For cable blocking and similar applications, there is not necessarily a requirement for the inner surface of the article to be smooth (since the substrate may not be). Thus the heat stable flanges projecting from the surface of the article may project outwardly from or inwardly into the article, or both.

Depending on their application, articles according to the invention may be coated on their internal and/or external surfaces with adhesive or sealant, or contain a mass of sealant.

The electrodes and/or support flanges are preferably arranged in pairs of opposite polarity. Thus, for a tubular article, there may be one pair or several pairs of longitudinal electrodes around the circumference of the article.

The article according to the invention may be made by any suitable method, e.g. by extrusion or by moulding.

In articles according to the invention, the wall thickness of the article may be varied along its length. Also two or more layers of different materials may be used. The second or additional layer may extend along the whole or along only part of the length of the article. They may have electrical properties e.g. room temperature, resistivity and resistivity/temperature behaviour, that is the same as, or different to, that of the first material. As an example, the second or subsequent layers may comprise a material that exhibits traditional PTC behaviour or ZTC (zero temperature coefficient of resistivity) behaviour. The effect of the additional layer(s) is that it (they) provide additional material through which electrical current can flow, and hence provide additional heating. By appropriate choice of the resistivity of the material of the additional layer(s) greater heating can be achieved than would be the case were a similar additional thickness of the first material used. This may be advantageous, for example, to decrease recovery times in certain regions, or where a higher temperature is required. Therefore in some preferred embodiments second or subsequent layers of material different to the first material are added in selected regions.

Another example of using two layers of different material is where certain properties, e.g. flame retardancy, solvent resistance, abrasion resistance, electrical insulation, impact resistance, colour coding are required.

Where two or more layers are used these may be applied separately, for example by sequential extrusion or may be co-extruded.

It may be useful to include a layer of material adjacent to the electrodes having a resistivity lower than that of the bulk of the material, for example to minimise heating around the electrodes. This additional layer may be ZTC, NTC or PTC.

For some applications it is desirable to provide a cutoff switching mechanism to avoid severe overheating of articles according to the invention. Overheating might occur, for example, if an installer omitted to switch off the electrical power supply when recovery was complete, so that heating occurred for several minutes thereafter. Such overheating is a particular danger if a composition is used which exhibits negative curlover resistivity at a particular temperature. The PTC material surrounding the electrode is preferably selected to exhibit the sharp rise in resistivity at a temperature above the temperature at which the "peak" resistivity of the bulk polymer of the article is reached. This means that the supply of electrical current to recover the article will only be switched off if temperatures are reached in excess of those needed to effect recovery.

The present invention may be utilised in a variety of articles of different shapes. They are generally tubular, and may be open at one or both ends.

Any articles or materials or electrode configurations etc. disclosed herein may be used to make a variety of products for the cable accessories industry. One product, in particular that can embody the present invention is one that can seal splices in air core or filled cables in pedestals. Such a product, although not electrically-shrinkable, is marketed by Raychem under the trade mark PEDCAP. It is similar in shape to that illustrated in the drawings.

In general, such a product is a large cap that can fit over a butt splice between cables, the total pair count being from, say, 20 to 500, generally 50–400 depending on size. The splice bundle will generally have a maximum diameter of say 12 cm, preferably 10.3 cm and a length of say 40 cm. Thus, the product preferably has a diameter of 8–16 cm, more preferably 10–14 cms and an overall length of 50–90 cms, more preferably 60–80 cms.

One end of the cap will be closed generally having a dome shape and the other end will be heat-shrinkable and provided with electrodes, as illustrated. The part with electrodes may be integral with the rest (as illustrated) or it may comprise a detachable base. The base may be attachable to the rest by abutting, optionally with a slightly telescopic fit. Each part may bear an annular ridge, which ridges can be held together by an o-clamp of suitable cross-sectional shape. Such a design allows easy re-entry into the closure without disturbing seals to the cables.

Since it is a splice that is being sealed, two (or more) cables will enter the base of the cap. This can result in a problem in forming a seal since on shrinkage of the base to form the desired seal, the base will attempt to adopt the configuration of smallest size, and this will be a generally oval shape around the side-by-side cables. Leak paths will therefore exist into the cap due to the concave or re-entrant combined shape of the two cables.

This problem can be overcome by the use of a branch-off clip as disclosed in U.S. Pat. No. 4,648,924 (Nolf) the disclosure of which is incorporated herein by reference. Such a clip forms at least two conduits in the open end of the cap, by bringing together between the cables circumferentially spaced portions of the wall of the cap.

We have discovered, however, that an excellent seal can be made in the article of the present invention by building up the cables so that their combined periphery corresponds to the shape of the outlet of the cap, i.e is substantially circular. This can be done in a similar fashion to that disclosed in U.S. Pat. No. 4,685,683 (Hall) the disclosure of which is incorporated herein by reference. In that case a branch-off seal is made between a cable and a surrounding sleeve by means of a flexible envelope containing a void-filling composition, the composition undergoing a change of viscosity.

We have further discovered that a seal made by employing an electrically-heated filling piece or branch-of clip between the cables can produce excellent results in the context of the present invention. The clip and filling piece can be powered from the same power supply as the cap to achieve exactly the desired heating without cable damage. Such a clip and filling piece are disclosed in a different context in U.S. Pat. Nos. 4,641,009 (Vansant) and 4,680,065 (Vansant) the disclosures of which are incorporated herein by reference.

To aid sealant or adhesive flow it may be preferably to include secondary heating means, possibly powered from the same supply, such as for example a heated clip or a strip heater tape such as described in GB No. 28704232 etc. etc. the disclosures of which are incorporated herein by reference.

Such heaters, we have found, can be used in conjunction with sealing materials such as heat-activatable adhesives, by wrapping around branching cables at the base of an article of the invention to produce an excellent branch-off seal. The adhesive may be provided as a coating on each side of the heater, or applied (for example in strip form) separately.

The present invention further provides any one or more of the above branch-off or sealing techniques or product types in combination with an article at least a portion of which is heat-recoverable, which comprises electrically conductive polymeric material, the article having at least one pair of integrally formed support elements, which themselves comprises conductive polymeric material, for supporting an electrode, through which elements current can be supplied to the said heat-recoverable portion, which element remains substantially undeformed during recovery of the article, other than to accommodate transitions.

Embodiments of the invention will now be described, by way of example, with reference to the accompanying drawing, wherein.

Figure 1:
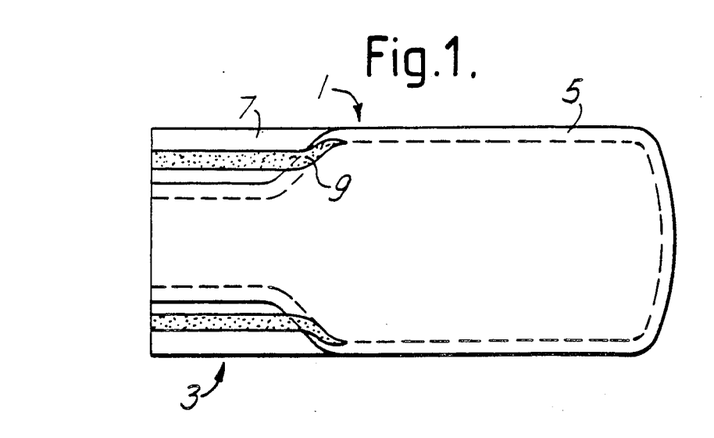
FIG. 1 is a side elevation of an article according to the invention, before expansion to render it recoverable.
Figure 2:
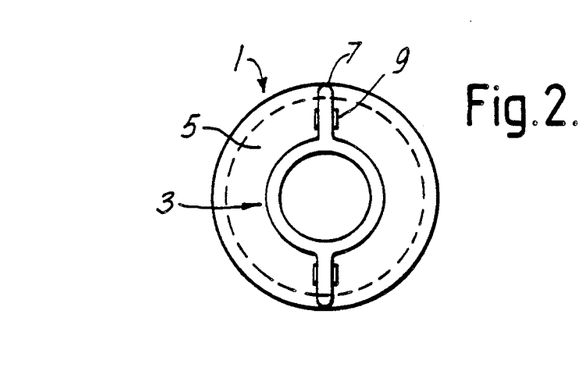
FIG. 2 is an end view of the article of FIG. 1.

Referring to the drawings, FIGS. 1 and 2 shows a tubular article 1 comprising an end section 3 and a main body section 5. The article has been made by blow moulding.

End section 3 is of smaller diameter than main body section 5. Two support elements 7 extend along end section 3 and meet body section 5. Elements 7 have been made by compression moulding, and extend along diametrically opposed sides of end section 3. Silver paint electrodes 9 in strip form extend along each of the support elements 7, and extend slightly beyond the end of elements 7, onto main body section 5.

Figure 3:
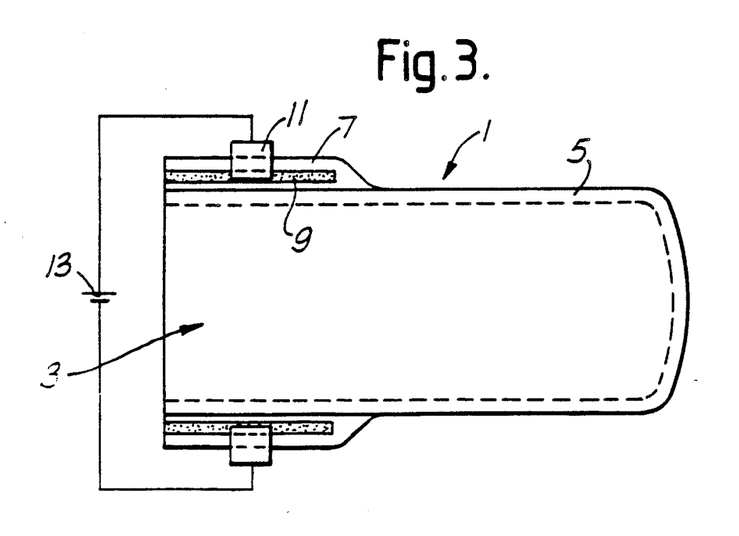
FIG. 3 is a side elevation of the article of FIGS. 1 and 2 after expansion.

FIG. 3 shows the article of FIG. 1 after expansion, i.e. a recoverable article according to the invention. Only end section 3 is expanded.

Figure 4:
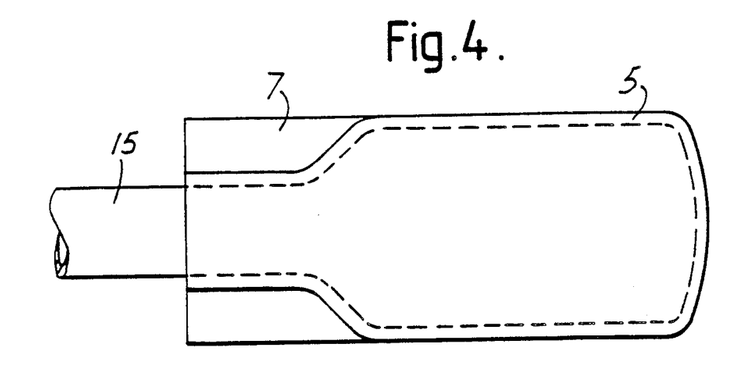
FIG. 4 is a side elevation of the article of FIG. 3 recovered over a substrate.

Recovery is effected by affixing crocodile clips 11 connected to a power supply 13 to electrodes 9. The electrodes spread the current along the elements and then current flows between the electrodes around the circumference of the article. This heats the article and causes heat recovery. FIG. 4 shows the article recovered onto a cable substrate 15. Since the electrodes are fixed to heat stable element 7, there is no risk of loss of contact, or for example rupture, e.g. cracking, of the silver paint.

Figure 5:
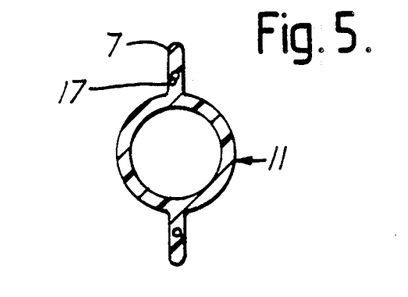
FIGS. 5 and 6 are end and longitudinal sectional views through an alternative embodiment according to the invention.
Figure 6:
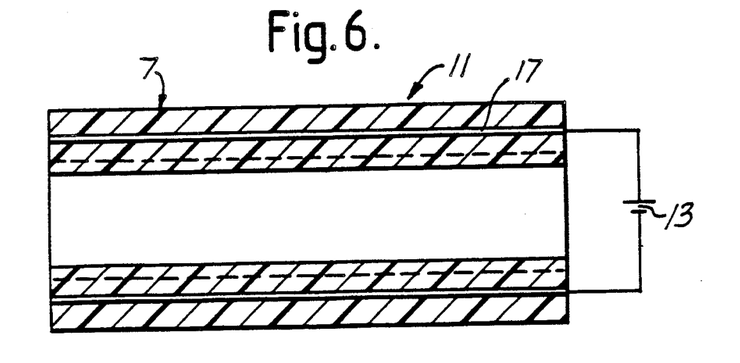

FIGS. 5 and 6 show an alternative embodiment in which the electrodes are embedded in the article rather than on the surface thereof.

The embodiment of FIGS. 5 and 6 is similar to that of FIGS. 1-4. However in this case it is a straight tube and heat stable support elements 7 extend along the entire length of the tubular article. The electrodes are copper wires embedded in the support flanges 7 rather than paint electrodes on the surface. The electrodes extend slightly beyond the free end of the end section 3 for connection to power source 13 (FIG. 6). Since the electrodes are embedded in a heat stable element 7 there is no risk of increase of contact resistance due to mechanical stress or movement at the electrode/conductive polymer interface.

Figure 7:
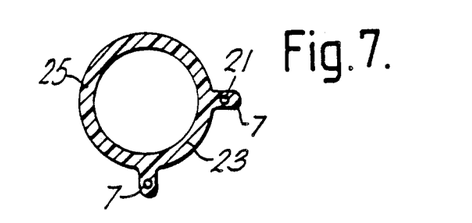
FIG. 7 is an end sectional view of yet another embodiment according to the invention.

FIG. 7 is another embodiment. In this case electrodes 21 are embedded in heat stable support elements 7 as in the embodiment of FIGS. 5 and 6. However the elements 7 are non-uniformly spaced around the circumference, defining minor and major circumferential portions 23 and 25 respectively. Only portion 23 has been expanded to render it radially heat recoverable. Portion 25 is heat-stable. Thus on recovery only portion 23 changes its configuration, the length between the flanges 7 through portion 23 becoming shorter. This embodiment can be used where only a small amount of recovery, could be obtained by arranging that only portion 23 is electrically conductive. Thus if electrical current is used to effect recovery only the portion 23 will recover. In another embodiment, only major portion 25 could be recovered, in a similar way.

Figure 8A:
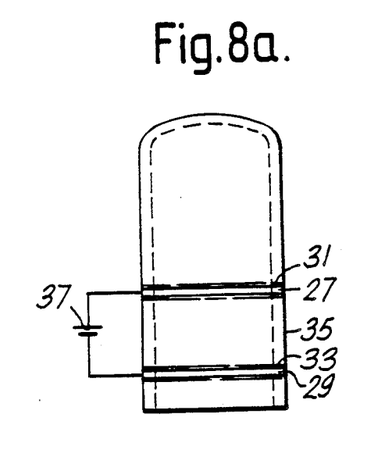
FIGS. 8a and 8b are side elevations of a further embodiment according to the invention, before and after recovery.
Figure 8B:
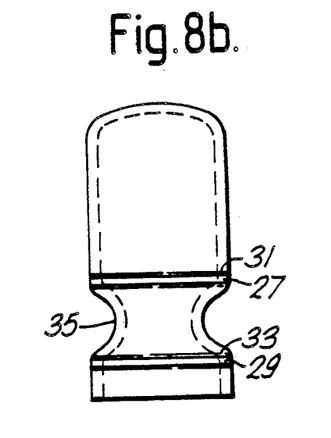

FIGS. 8a and 8b show another embodiment. In this case silver paint electrodes 27 and 29 are circumferential. The electrodes are painted on heat stable circumferential portions 31 and 33 respectively, and connected to power source 37. The portion 35 of the article has been expanded radially to render it radially heat-recoverable. When the article is powered portion 35 shrinks radially (FIG. 8b). The heat stable portions 31 and 33 remain substantially undeformed.

Figure 9A:
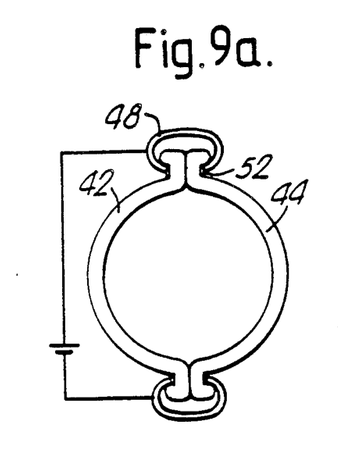
FIGS. 9a to 9c are wraparound articles according to the present invention.
Figure 9B:
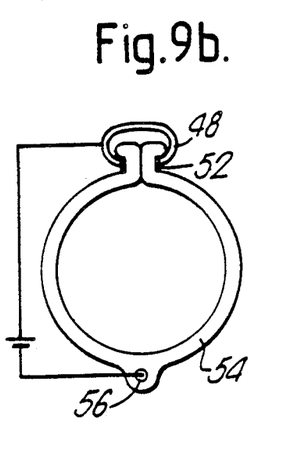
Figure 9C:
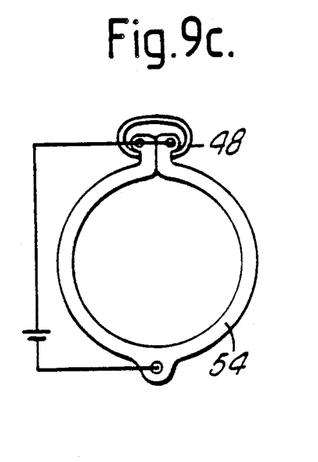

FIGS. 9a and 9c show a number of arrangements for electroding wraparound heaters. Two half shells 42, 44 are joined by closure 48 through which they are powered. The silver paint contacts are referenced as 52. Another electrode 56 is embedded in the wraparound part on the opposite side of the tubular part. In FIG. 9c, there is only a single wraparound part joined by a closure 48. Both electrodes are embedded in the conductive polymeric material on opposite sides of the tubular part.

In the embodiment shown in FIG. 9a both the half shells 42 and 44 comprise heat recoverable electrically conductive polymeric material. In another embodiment only one half shell may be heat recoverable and/or electrically conductive. This means that only one side will recover and/or heat However this may be sufficient for certain applications. In yet another embodiment one half shell may be elastomeric and the other half shell electrically conductive (optionally heat recoverable). In this case he elastomeric half shell can cause the article to be urged into contact with the substrate and the electrically conductive half shell can cause the heat required Also the two half shells may be replaced by more than two parts, i.e. multiple segments may be used. In all cases the segments may be the same or different sizes.

We claim:
1. An article which
(1) is heat recoverable, and
(2) comprises
  (a) a heat recoverable element which is composed of a conductive polymer and
  (b) at least two support elements which
    (i) are not heat recoverable, and
    (ii) are spaced apart from each other, so that if an electrode is attached to each support element and connected to a suitable power source, current passes between the electrodes through the conductive polymer element and generates heat therein which thereby effects recovery of the article,
with the proviso that, if the article is of open cross-section, at least one of the support elements is not part of a closure system for maintaining the article in a tubular configuration around a substrate.

2. An article according to claim 1 which is tubular of open or closed cross-section.

3. A tubular article according to claim 2, wherein the support elements are arranged such that, when electrodes attached thereto are powered, current flows around the circumference of the tube along at least two discrete current paths, at least one of the current paths being clockwise and at least one of the current paths being anti-clockwise, when the article is viewed axially from one end of the article.

4. An article according to claim 3, wherein at least part of the tubular article in each of the current paths comprises a heat recoverable conductive polymer element.

5. An article according to claim 2, wherein there are two support elements each of which comprises a longitudinal flange extending in the direction of the length of the tube, and the flanges define minor and major circumferential portions of the article.

6. An article according to claim 2, wherein each of the support elements comprises a longitudinal flange extending in the direction of the length of the tube.

7. An article according to claim 5, wherein the minor or major circumferential portion of the article is heat recoverable.

8. An article according to claim 6, wherein there are two support elements diametrically opposed to each other.

9. An article according to claim 6 wherein the longitudinal flanges extend part way only along the length of the tube.

10. An article according to claim 2, wherein the heat recoverable element is radially heat shrinkable.

11. An article according to claim 1, which is tubular, wherein only one longitudinal section of the tube is heat recoverable.

12. An article according to claim 1 additionally comprising electrodes supported on the elements.

13. An article according to claim 12, wherein the support elements comprise (i) longitudinal flanges extending part way only along the length of the article and (ii) part of the main body of the article and wherein at least one of the electrodes extends beyond an end of the flange(s) onto the remaining part of the support element.

14. An article according to claim 12, wherein at least one of the support elements contacts a body of conductive polymer.

15. An article according to claim 14, wherein the resistance to current flow of the heat recoverable conductive polymer element is greater in a region adjacent to the electrode end than it is in a region adjacent to the main length of the electrode.

16. An article according to claim 14, wherein the resistivity of the conductive polymer in the heat-recoverable element in a region adjacent to the electrode end is greater than the resistivity of the conductive polymer in the heat-recoverable element in a region adjacent to the main length of the electrode.

17. An article according to claim 1 which comprises an electrode attached to each support element.

18. An article with
(1) is heat recoverable, and
(2) comprises
  (i) an element composed of a conductive polymer, and
  (ii) two electrodes which can be connected to a source of electrical power to cause current to pass through the conductive polymer element and to generate heat therein which effects recovery of the article;
at least one of the electrodes being in contact with the conductive polymer element only through a support element which
  (a) is part of the conductive polymer element and
  (b) whose shape does not change substantially during unrestrained recovery of the article
with the proviso that, if the article is of open cross-section, at least one of the electrodes is not part of a closure system for maintaining the article in a tubular configuration around a substrate.

19. An article according to claim 18, wherein each of the electrodes is in contact with the conductive polymer element through a support element which forms part of the conductive polymer element and whose shape does not change substantially during unrestrained recovery of the article.

20. An article according to claim 19, wherein the conductive polymer element comprises a central portion which lies between the support elements and which is heat-recoverable.

21. An article according to claim 19, wherein each of the electrodes is not heat recoverable and wherein the article comprises a heat-recoverable portion which is not composed of conductive polymer, to which a central conductive polymer portion is attached, and which recovers when the article is recovered.

22. An article according to claim 19, wherein the conductive polymer element is monolithic.

23. A tubular article which
   (1) is heat recoverable, and
   (2) comprises
      (a) a heat recoverable element comprising a conductive polymer element which is composed of a conductive polymer and
      (b) at least two supporting elements which
         (i) are not heat recoverable, and
         (ii) are spaced apart from each other so that, if an electrode is attached to each support element and connected to a suitable power source, current passes between the electrodes through the conductive polymer element along at least two discrete current paths, at least one of the current paths being clockwise and at least one of the current paths being anti-clockwise, when the article is viewed axially from one end of the article, and the passage of the current generates heat in the conductive polymer element which effects recovery of the article.

24. An article according to claim 23 which has a closed cross-section.

25. An article according to claim 23, wherein the conductive polymer element is heat recoverable.

26. An article according to claim 23, which has an open cross-section.

27. An article according to claim 23, wherein the heat recoverable element is radially heat shrinkable.

28. A tubular article which
   (1) is heat recoverable, and
   (2) comprises
      (i) an element composed of a conductive polymer, and
      (ii) at least two spaced-apart electrodes which can be connected to a source of electrical power to cause current to pass through the conductive polymer element along at least two discrete current paths, at least one of the current paths being clockwise and at least one of the current paths being anti-clockwise, when the article is viewed axially from one end of the article, and to generate heat in the conductive polymer element which effects recovery of the article; at least a first electrode being in contact with the conductive polymer element only through a region of the article which
         (a) is part of the conductive polymer element and
         (b) whose shape does not change substantially during unrestrained recovery of the article.

29. An article according to claim 28 which has a closed cross-section.

30. An article according to claim 28, wherein the conductive polymer element is heat recoverable.

31. An article according to claim 28 which has an open cross-section.

32. An article according to claim 28, wherein the heat recoverable element is radially heat shrinkable.

33. An article according to claim 30 which comprises at least one electrode which (i) is pliant, (ii) is on the surface of or embedded in the heat recoverable element, and (iii) changes shape on recovery of the article.

34. An article according to claim 30 which has an open cross-section and which comprises at least one electrode which is embedded in a support element which forms part of a closure system for the article.

35. An article according to claim 34, also comprising a pliant electrode which (i) is on the surface of or embedded in the heat recoverable element and (ii) changes shape on recovery of the article.

36. An article according to claim 35, wherein the pliant electrode is a braid or mesh.

37. A tubular heat recoverable article which comprises
   (i) an element composed of a first conductive polymer, and
   (ii) at least two integrally formed, spaced apart support elements in the form of longitudinal flanges, which extend substantially parallel to each other and are circumferentially spaced from each other, each of which support elements:
      (a) comprises a second conductive polymer, which may be the same as or different from the first conductive polymer,
      (b) is positioned so that, when an electrode is positioned in or on each of the support elements, the electrodes can be connected to a source of electrical power to cause current to pass through the support elements and through the conductive polymer element along at least two discrete current paths extending around the periphery of the tubular article, at least one of the current paths being clockwise and at least one of the current paths being anti-clockwise, when the article is viewed from one end of the article, and to generate heat in the conductive polymer element which effects recovery of the article, and
      (c) remains substantially undeformed during unrestrained recovery of the article.

38. A tubular heat-recoverable article which comprises
   (i) an element composed of a first conductive polymer, and
   (ii) at least two support elements in the form of annular flanges which are substantially parallel to each other and are longitudinally spaced from each other, each of which support elements:
      (a) comprises a second conductive polymer which may be the same as or different from the first conductive polymer,
      (b) is positioned so that, when an electrode is positioned on or in each of the support elements, the electrodes can be connected to a source of electrical power to cause current to pass through the support elements and through the conductive polymer element along the length of the tube, and to generate heat in the conductive polymer element which effects recovery of the article, and
      (c) remains substantially undeformed during unrestrained recovery of the article.

* * * * *

UNITED STATES PATENT AND TRADEMARK OFFICE
CERTIFICATE OF CORRECTION

PATENT NO. : 4,990,380

DATED : February 5, 1991

INVENTOR(S) : Jensen, et al.

It is certified that error appears in the above-identified patent and that said Letters Patent is hereby corrected as shown below:

Column 2, lines 6 to 7, replace "electrodes" by --electrodes.--

Column 3, line 11, replace "thereof" by --thereof.--.

Column 3, line 45, replace "plyacrylates," by --polyacrylates,--.

Column 6, line 68, after "part of the" insert --X - Y%--.

Column 7, line 25, replace "directed, electrode" by --directed electrode--.

UNITED STATES PATENT AND TRADEMARK OFFICE
CERTIFICATE OF CORRECTION

PATENT NO. : 4,990,380

DATED : February 5, 1991

INVENTOR(S) : Jensen, et al.

It is certified that error appears in the above-identified patent and that said Letters Patent is hereby corrected as shown below:

```
Column 11, line 22, replace "branch-of" by --branch-off--.

Column 11, line 31, replace "preferably" by --preferable--.

Column 11, line 50, replace "comprises" by --comprise--.

Column 12, line 8, replace "shows" by --show--.

Column 13, line 24, replace "he" by --the--.

Column 13, line 27, replace "required" by --required.--.
Column 14:
Claim 18, line 1, replace "with" by --which--.
```

Signed and Sealed this

Seventeenth Day of August, 1993

Attest:

BRUCE LEHMAN

*Attesting Officer*  *Commissioner of Patents and Trademarks*